(12) United States Patent
Tripunitara et al.

(10) Patent No.: US 9,325,714 B2
(45) Date of Patent: *Apr. 26, 2016

(54) SYSTEM AND METHODS FOR ACCESS CONTROL BASED ON A USER IDENTITY

(71) Applicant: Google Technology Holdings LLC, Mountain View, CA (US)

(72) Inventors: Mahesh V. Tripunitara, Elgin, IL (US); Dean H. Vogler, Algonquin, IL (US); Patrick Toomey, Chicago, IL (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/341,480

(22) Filed: Jul. 25, 2014

(65) Prior Publication Data

US 2014/0337934 A1 Nov. 13, 2014

Related U.S. Application Data

(63) Continuation of application No. 12/107,134, filed on Apr. 22, 2008, now Pat. No. 8,819,422.

(51) Int. Cl.
*H04L 29/06* (2006.01)
*H04L 12/28* (2006.01)

(52) U.S. Cl.
CPC ............. *H04L 63/10* (2013.01); *H04L 63/08* (2013.01); *H04L 63/101* (2013.01); *H04L 2012/2849* (2013.01)

(58) Field of Classification Search
CPC ........................ H04L 63/10; H04L 63/08
USPC .................. 726/2, 4, 5, 17; 713/153, 155, 183
See application file for complete search history.

(56) References Cited

U.S. PATENT DOCUMENTS

| | | | |
|---|---|---|---|
| 8,403,755 B2* | 3/2013 | Kerr | 463/42 |
| 2002/0062451 A1 | 5/2002 | Scheidt et al. | |
| 2002/0112177 A1 | 8/2002 | Voltmer et al. | |
| 2003/0236977 A1 | 12/2003 | Levas et al. | |
| 2004/0208151 A1* | 10/2004 | Haverinen et al. | 370/338 |
| 2005/0021969 A1* | 1/2005 | Williams et al. | 713/176 |
| 2005/0138410 A1 | 6/2005 | Masuouka et al. | |
| 2005/0188193 A1 | 8/2005 | Kuehnel et al. | |
| 2005/0240758 A1 | 10/2005 | Lord et al. | |

(Continued)

OTHER PUBLICATIONS

"Configuring Authentication for Access Points"—Cisco Wireless LAN Controller Configuration Guide, Release 7.4, Cisco, Jul. 2006 http://www.cisco.com/c/en/us/td/docs/wireless/controller/7-4/configuration/guides/consolidated/b_cg74_CONSOLIDATED/b_cg74_CONSOLIDATED_chapter_01101100.pdf.*

(Continued)

*Primary Examiner* — Randy Scott
(74) *Attorney, Agent, or Firm* — Byrne Poh LLP

(57) ABSTRACT

System and methods for access control in a Universal Plug and Play (UPnP) network are based on a user identity. A control point has an identity assertion capability for identifying a user. The control point is configured to declare a value of an attribute associated with the identity assertion capability. A device is communicatively coupled to the control point via the UPnP network. The device has a first access control list and a trusted-to-identify access control list (TIA). The device is configured to permit the user to perform one or more actions based upon whether the user identity appears as a subject in the first access control list.

18 Claims, 7 Drawing Sheets

(56) References Cited

U.S. PATENT DOCUMENTS

| | | | |
|---|---|---|---|
| 2006/0026671 A1* | 2/2006 | Potter | H04L 63/08 726/7 |
| 2006/0156388 A1* | 7/2006 | Stirbu | H04L 63/0807 726/4 |
| 2006/0185004 A1 | 8/2006 | Song et al. | |
| 2006/0239452 A1 | 10/2006 | Jung et al. | |
| 2006/0253852 A1 | 11/2006 | Honda et al. | |
| 2007/0208948 A1 | 9/2007 | Costa-Requena et al. | |
| 2008/0072292 A1 | 3/2008 | Narjala | |
| 2008/0092211 A1 | 4/2008 | Klemets et al. | |

OTHER PUBLICATIONS

International Preliminary Report on Patentability dated Oct. 26, 2010 in International Application No. PCT/US2009/038726.

International Search Report and Written Opinion of the International Search Authority dated May 14, 2009 in International Patent Application No. PCT/US2009/038726.

Office Action dated Dec. 22, 2011 in U.S. Appl. No. 12/107,134.

Office Action dated Apr. 1, 2011 in U.S. Appl. No. 12/107,134.

Office Action dated Aug. 3, 2012 in U.S. Appl. No. 12/107,134.

Office Action dated Sep. 10, 2013 in U.S. Appl. No. 12/107,134.

Shi et al., "Authentication Control Point and Its Implications for Secure Processor Design", In Proceedings of the 39th Annual IEEE/ACM International Symposium on Microarchitecture, Orlando, Florida, US, Dec. 9-13, 2006, pp. 103-112.

International Search Report and Written Opinion of the International Search Authority dated May 28, 2009 in International Patent Application No. PCT/US2009/038724.

* cited by examiner

SYSTEM AND METHODS FOR ACCESS CONTROL BASED ON A USER IDENTITY

CROSS-REFERENCE TO RELATED APPLICATION

This application is a continuation of U.S. patent application Ser. No. 12/107,134, filed Apr. 22, 2008, which is hereby incorporated by reference herein in its entirety.

BACKGROUND

Universal Plug and Play (UPnP) is an industry effort to evolve technology for easy setup and easy establishment of connectivity of home and enterprise computer equipment. The UPnP standard enables devices such as personal computers (PCs), computer peripherals, routers, printers, storage devices, set-top boxes, televisions, and mobile phones to automatically discover each other, connect, and interoperate seamlessly. UPnP is also one of the enabling technologies for the Digital Living Network Alliance (DLNA), which endeavors to enable the digital convergence of devices in home and enterprise networks. UPnP is a fundamental building block of the DLNA specification, which may be currently considered a de facto standard for home network interoperability.

In UPnP, components are conventionally categorized as devices or control points (CPs). A device contains services. A control point is able to discover devices, and is able to control the services offered by the devices (e.g., by using Remote Procedure Call within Simple Object Access Protocol). A service, among other capabilities, is able to receive action requests from a control point, and perform the requested actions. Thus, a control point is able to invoke actions associated with the devices. In an illustrative example, a UPnP-compliant videocassette recorder (VCR) device may host a VCR service, and the VCR service may be associated with actions such as play, stop, pause, rewind and fast-forward.

In a conventional UPnP security specification, a network may include a third type of UPnP component, a security console, that is both a device and a control point. A security console can be used to set up ACLs in devices. In order to set up security in a UPnP network, all control points and devices must be made known to the security console. A security console acts as a control point to discover devices in a network, and acts as a device (e.g., by exposing a special security console service) in order to be discoverable by control points. The security console can take ownership of devices, and then create an Access Control List (ACL) for the device, in which restricted access is explicitly given to control points.

Conventional UPnP devices are able to enforce access control based on the use of ACLs. An ACL is used within a device to control access rights to services or to actions, and thus to control what actions may be invoked by a control point. For a particular device, each of the entries in the device's ACL identifies what a subject (e.g., a uniquely identified control point, or a specified group of control points) is allowed to do on the device, and whether the CP or group of CPs can further delegate those rights to other CPs. Delegation is the act by which a CP is able to grant a right that it has to another CP. A variety of delegation capabilities are available in conventional UPnP devices via the use of authorization certificates.

BRIEF DESCRIPTION OF THE DRAWINGS

Embodiments are illustrated by way of example and not limited in the following figure(s), in which like numerals indicate like elements, in which.

DETAILED DESCRIPTION

Figure 1A:
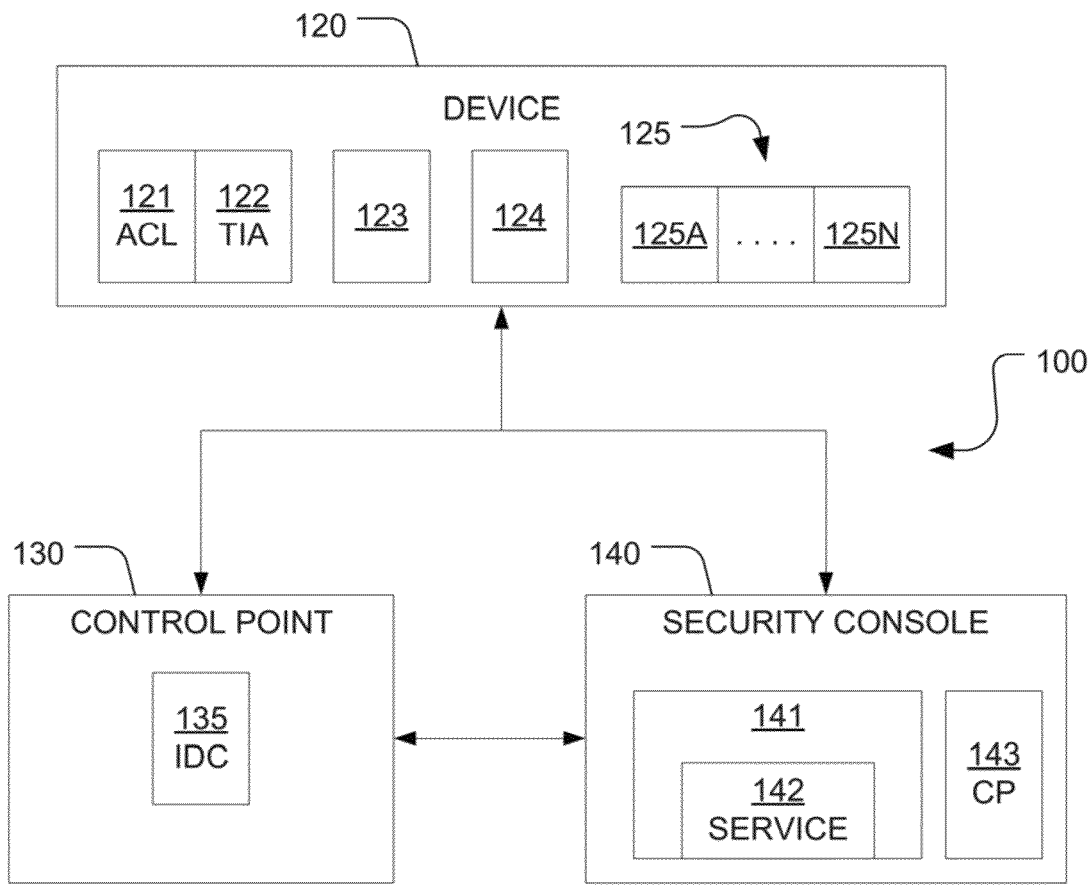
FIG. 1A illustrates a block diagram of an exemplary UPnP network, according to an embodiment.

Before describing in detail embodiments that are in accordance with the present invention, it should be observed that the embodiments reside primarily in combinations of method steps and apparatus components. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Personal devices, such as mobile phones, can act as control points in a UPnP network. Such devices are increasingly equipped with hardware and software features for reliably verifying a user's identity. Examples of such features may include biometric authentication (e.g., fingerprint identification, voice verification, retinal scanning, and the like), and other trusted authentication techniques. Biometric authentication in personal devices may be viewed as particularly trustworthy, in the context of identity management.

For personal devices, such as mobile phones, that are capable of asserting user identity, it is desirable to integrate the capabilities of these devices into the access control methodology for UPnP. Access control based on user-device asserted identity in a UPnP network raises issues of trust: that is, whether a UPnP control point is trusted to: (a) authenticate a user with fidelity, and to (b) communicate the credentials of the user to the UPnP device that is the provider of services to the user. If so, the credentials can be used for access control by the UPnP device that is the provider of services to the user.

In accordance with an embodiment of the invention, a control point includes an attribute called Identity Assertion Capable (IDC). The IDC attribute indicates whether the control point is capable of authenticating the user. In accordance with a further embodiment, a device used to control access to services includes, in addition to the conventional ACL, a Trusted to Identify ACL (TIA) feature. The TIA can be used to indicate whether a particular control point is trusted by the device to make assertions regarding the user's identity.

For simplicity and illustrative purposes, principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

With reference first to FIG. 1A, an exemplary UPnP network 100 is shown, according to an embodiment. It should be understood that the following description of UPnP network 100 is but one of a variety of different manners in which such a UPnP network 100 may be configured and operated. In addition, it should be understood that the UPnP network 100 may include additional components and that some of the components described may be removed and/or modified without departing from a scope of the UPnP network 100.

There are two main types of entity in a UPnP network 100: control points (e.g., exemplary control point 130) and devices (e.g., exemplary device 120). There is a third type of entity called a security console (e.g., exemplary security console 140) that can be used for security administration.

A control point 130 is referred to as "security-aware" if it supports at least conventional UPnP ACL-based security. In an embodiment of the present invention, control point 130 is associated with an attribute, Identity Assertion Capable (IDC) 135, which may in some embodiments be implemented as a bit having a binary value, and in other embodiments may have non-binary values (e.g., the IDC 135 may be implemented as an integer, enumerated value, bitmapped value, and the like). In an illustrative example, when a user requests access to a device 120 using a control point 130, the control point 130 may declare that the value of IDC 135 for the control point 130 is either "true" or "false." If control point 130 makes no declaration, it can be assumed that the value is "false" for that control point 130. Thus, in an embodiment, when a user attempts to access a device 120 using a control point 130, the device 120 is able to know whether or not the control point 130 is capable of identifying the user. Allowing the default value of the IDC 135 to be "false" allows backward compatibility with the conventional UPnP security specification. If the IDC 135 is "false" for a control point 130, then access control at the device 120 reverts to being based on the control point 130, and not on the user. In further embodiments, IDC 135 may be permitted to have additional non-binary values (e.g., integer, bitmapped, or enumerated values) for providing additional information concerning capabilities of the control point 130.

Device 120 exposes services (e.g., services 125A through 125N, collectively services 125), each of which comprises actions. Actions are specified by the individual services 125. The UPnP specifications define a conventional set of pre-specified services 125 and corresponding actions for many typical applications (such as printing, lighting control, etc.).

In device 120, access control is enforced on control points or users, and their permitted actions. The exemplary security-aware device 120 includes an ownership list 123, and generally includes an access control list (ACL) 121, and zero or more certificates 124. Entries in the ownership list 123 can be used to grant an owner (e.g., security console 140) full access to all actions of the services 125 of the device 120. In an embodiment of the present invention, device 120 also includes a Trusted to Identify ACL (TIA) 122, which in some embodiments may be an additional access control list, or which in further embodiments may be implemented as part of ACL 121 (e.g., as a feature of ACL 121 or an extension or enhancement to ACL 121).

The security-aware device 120 can include an ACL 121 to enforce access control on control points (e.g., control point 130) that attempt to invoke actions on the device 120. Entries in the ACL 121 can be used to grant symbolic permissions to one or more control points (e.g., permissions having more granular access rights, in comparison to the full access granted to an owner). These symbolic permissions grant access to one or more actions of the services 125 exposed by the device 120. In an exemplary device 120 that supports ACL-based control, a DeviceSecurity service 125A is among the services 125 exposed by the device 120. The DeviceSecurity service 125A exports actions (such as conventional readACL and writeACL actions) that an exemplary security console 140 can use, for example, to modify or edit the ACL 121. Only a security console 140 that has ownership of the device 120 (i.e., a security console 140 listed in the ownership list 123 of device 120) may edit the ACL 121 of the device 120.

Figure 1B:
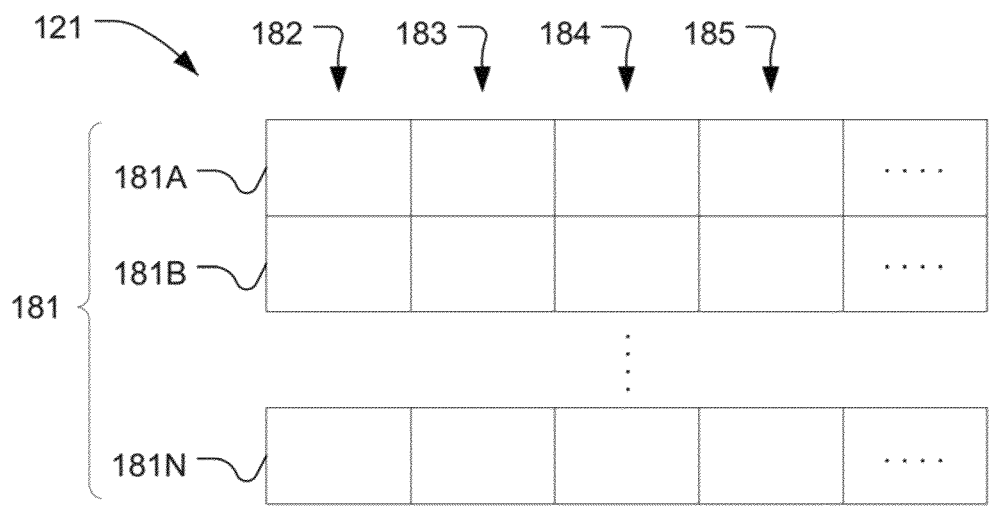
FIG. 1B illustrates a block diagram of an access control list, according to an embodiment.

Referring now to FIG. 1B, the ACL 121 comprises zero or more entries 181A, 181B . . . 181N (collectively, entries 181), illustratively depicted as horizontal rows in an exemplary table. Each entry 181 in ACL 121 conventionally has at least the following fields, illustratively depicted as columns in an exemplary table: subject 182, action 183, validity 184, and a do-not-delegate flag 185. Each entry 181 in the ACL 121 indicates that the subject 182 of the entry 181 is permitted to invoke a specified action 183 on the device 120, the permission being optionally limited to a validity 184 period, and optionally delegable based on do-not-delegate flag 185. Conventionally, the subject 182 field identifies either the identity of a control point 130, or the name of a group of control points. The action 183 field identifies some action associated with a service 125 hosted by the device 120, or the pre-defined action "all." Validity 184 is optional and may, for example, contain a not-valid-before field and/or a not-valid-after field. The do-not-delegate flag 185 is also optional, and indicates whether the privilege granted to the subject by the entry in the ACL 121 may be delegated to other subjects.

Returning to FIG. 1A, device 120 includes zero or more certificates. These may include zero or more name definition certificates (not shown), and zero or more authentication certificates 124. A name definition certificate can be used to define the members of a group that is associated with a name that can be used as the subject of an entry 181 in ACL 121. A name definition certificate that defines a group specifies the name associated with the group, the members of the group, and the issuer (e.g., security console 140) of the name definition certificate. Groups may be nested; i.e., the members of a group may include other groups. Each issuer has its own namespace for group names.

An authorization certificate 124 that delegates a privilege looks very similar to an ACL 121, but also includes an issuer and a device field, both of which apply globally to the whole authorization certificate 124 (i.e., issuer and device fields are not additional fields of an entry 181). The issuer may be a control point 130 or a security console 140 that issued the authorization certificate 124. The device field identifies the device (e.g., device 120) for which the authorization certificate 124 applies.

Security console 140 can be used for security administration. Security console 140 can act as either or both a device 141 and a control point 143. In its capacity as a device 141, the security console 140 exposes a security console service 142 (e.g., an improved SecurityConsole service according to an embodiment of the present invention). A security-aware control point 130 interacts with the security console 140 via the security console service 142. In an illustrative example, a user can register a security-aware control point 130 with a security console 140 and give the control point 130 an identity; later, this identity can be used to administer the control point 130. A security console 140, acting as a control point 143 itself, can administer any device 120 that exposes the DeviceSecurity service 125A. This can be used, for example, to take ownership of a device 120. Finally, the security console 140 can also be used to grant and revoke ownership of devices (such as device 120) to other security consoles (not shown).

In an embodiment of the present invention, a device 120 may perform access control directly on users. To be able to do this, an entry 181 in ACL 121 can have a user as its subject 182, and in a further embodiment, an authorization certificate 124 can have a user as its subject 182. The embodiments extend the access control capabilities conventionally specified in UPnP by allowing a subject 182 in an ACL 121 or in an authorization certificate 124 to be the identity of a user.

Figure 2:
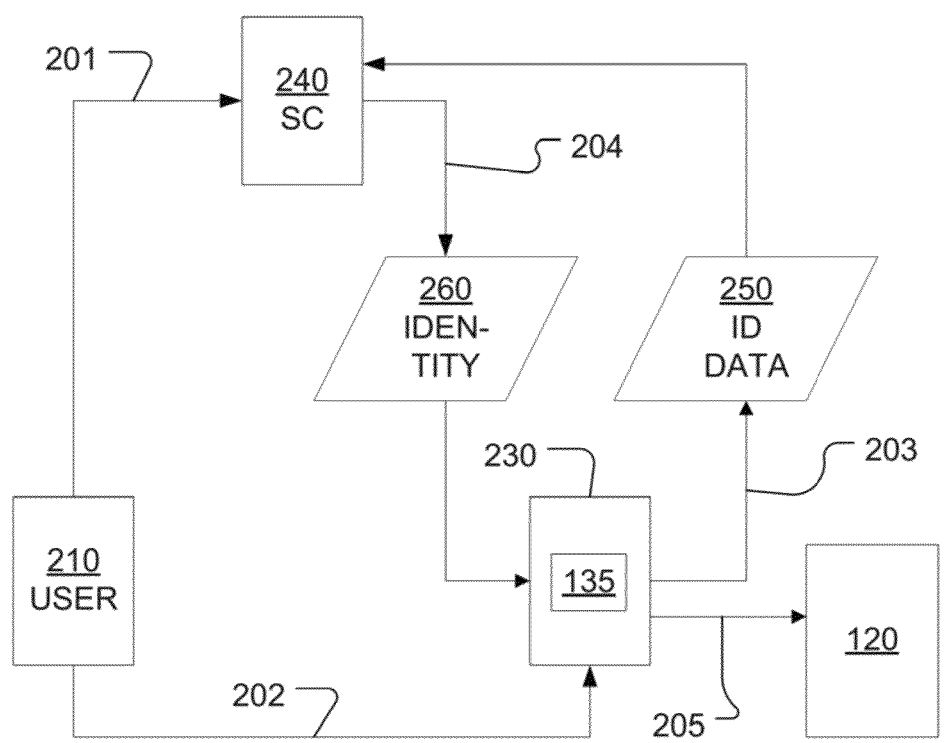
FIG. 2 is an exemplary data flow diagram that illustrates a registration process, according to an embodiment.

In FIG. 2, a data flow diagram of an illustrative registration process is shown for an embodiment. The process establishes the identity 260 of user 210 at a control point 230. In the future, when the user 210 uses the control point 230 to access a device (e.g., device 120 shown in FIG. 1), his or her identity 260 is communicated by the control point 230 to the device 120 for access control.

In a still further embodiment of the present invention, a given identity 260 for user 210 may be unique to a control point 230, or may be shared by several control points (for example, all of the control points in a UPnP network 100). In an embodiment, the registration process to establish an identity 260 for user 210 involves a UPnP security console (SC) 240.

In the illustrative embodiment depicted in FIG. 2, the user 210 performs an initiation 201, e.g., initiating registration by contacting a security console 240; in an illustrative example, the user 200 may push a button on SC 240. The user 210 then performs an identification 202. For example, the user 210 specifies with which control point 230 he or she intends to register, such as by pushing a button on the control point 230. The control point 230 identifies the user 210. The control point 230 performs a first communication 203, e.g., by communicating identity (ID) data 250, based on its identification of user 210, to the security console 240.

The security console 240 computes an identity 260 for the user that the control point 230 can use, and performs a second communication 204 to communicate the identity 260 back to the control point 230. In one embodiment, the identity 260 communicated from the security console 240 may be from a database maintained by security console 240, which could be the case when the user 210 has the same identity 260 across multiple points in the UPnP network 100. However, in a further embodiment, optionally the security console 240 simply computes a unique identity 260 for the user 210, communicates this identity 260 to the control point 230 and does not necessarily store the identity 260 (e.g., in the case that the user 210 has a different identity 260 at each control point). Either case may be appropriate for a particular UPnP network 100, and therefore an embodiment may permit either or both options, according to usability and security trade-offs that may be desired. Alternatively, in another embodiment, the control point 230 sends identity (ID) data 250 to the security console 240, and the security console 240 accepts the identity data 250 as the user identity 260.

In a further embodiment of the present invention, if the IDC 135 is true for control point 230, then the control point 230 can perform an assertion 205, such as by identifying itself 230 and identifying the user 210 (e.g., communicating the identity 260) to device 120. In the embodiment, the device 120 now determines whether it can trust the assertion about the identity 260 of user 210 made by the control point 230. For this purpose, in addition to the traditional capabilities of an ACL 121 conventionally specified in UPnP, a device 120 in an embodiment uses TIA 122. The TIA 122 includes a list of identities of trusted control points (e.g., an identity of a control point 230 may be stored as a hash of a public key uniquely associated with the control point 230, as conventionally specified in UPnP). If a control point 230 is in the TIA 121 of a device 120, then this means that the control point 230 is trusted by the device 120 to make an assertion concerning identity 260.

In an illustrative example, the device 120 first checks whether the identity of control point 230 is in TIA 121. If not, access is not granted to the user 210. If the identity of control point 230 is in TIA 121, the device 120 checks whether the user 210 is allowed access (based, e.g., on ACL 121, or authorization certificate 124). In addition, a further embodiment optionally provides that the device 120 checks whether the control point 230 is authorized for the action being invoked by checking the identity of the control point 230 in the conventional way specified in UPnP.

Figure 3:
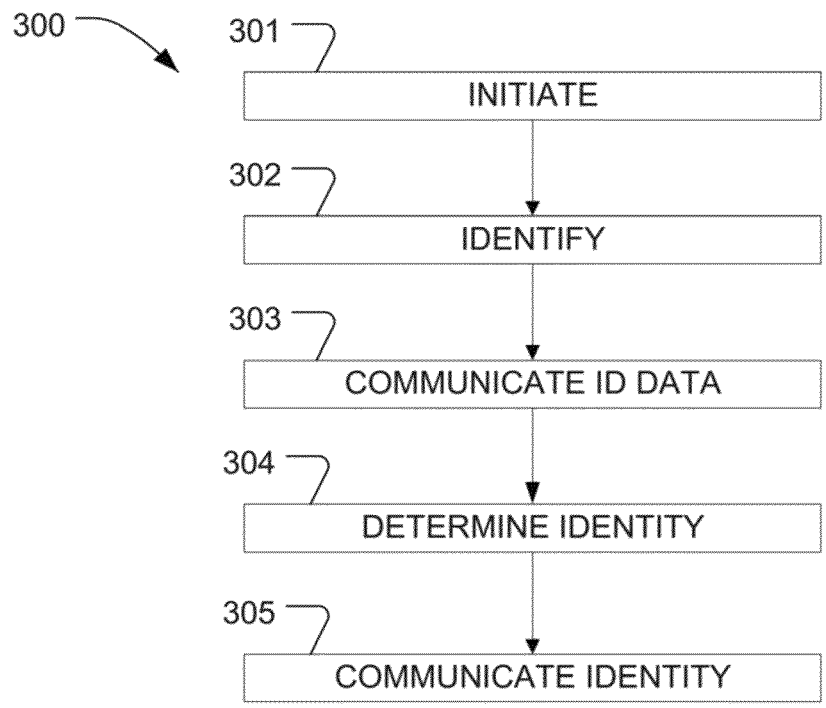
FIG. 3 is an exemplary flow diagram that illustrates a method for registration, according to an embodiment.

In FIG. 3, an illustrative method 300 for registration is shown for an embodiment. The registration method 300 establishes the identity 260 of user 210 at a control point 230, e.g., in the manner discussed above with reference to FIG. 2.

In the method 300, an initiating step 301 is performed, e.g., in a security console 240, by the user 210, who may initiate registration by contacting the security console 240. In an illustrative example, the user 210 may push a button on SC 240. In the method 300, an identify step 302 is performed, e.g., as shown in step 202 in FIG. 2. For example, the user 210 may specify with which control point 230 he or she intends to register, such as by pushing a button on the control point 230 or otherwise proceeding with identification as determined by the control point 230, which identifies the user 210. In a further illustrative example, the user 210 may undergo biometric verification by the control point 230; e.g., the control point 230 verifies a fingerprint of the user 210 to reliably identify the user 210. In another embodiment, the user 210 may provide a PIN or password to the control point 230 to reliably identify the user 210. In another embodiment, the user 210 may provide a token (e.g., a smart card) to the control point 230 to reliably identify the user 210. The control point 230 can obtain, look up, or derive ID data 250 based upon the reliable identification of the user 210. In some embodiments, ID data 250 comprises an alias of the user 210.

Next, in step 303, ID data 250 is communicated; e.g., the control point 230 communicates ID data 250, based on its identification of user 210, to the security console 240. In step 304, an identity 260 is determined for the user 210; e.g., the security console 240 computes an identity 260 that the control point 230 can use. Alternately, the security console 240 accepts ID data 250 as the identity 260. In step 305, the identity 260 is communicated. For example, the identity 260 may be communicated by the security console 240 back to the control point 230, and may then be communicated by the control point 230 to a device 120.

Figure 4:
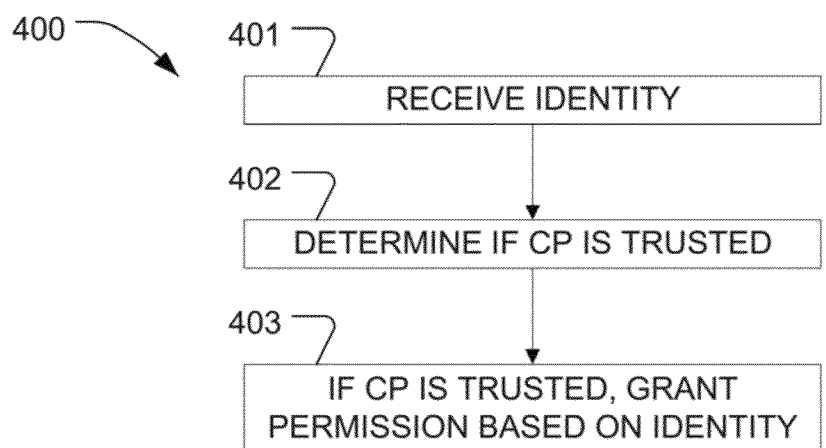
FIG. 4 is an exemplary flow diagram that illustrates a method for access control, according to an embodiment.

In FIG. 4, an illustrative method 400 for access control is shown for an embodiment. The access control method 400 can be performed, for example, in a device 120. In step 401, a user identity 260 for a user 210 is received from a control point 230 that has an identity assertion capability, e.g., IDC 135 set to "true". In step 402, the device 120 determines whether the control point 230 is trusted to assert the user identity 260. In step 403, if the control point 230 is trusted, permission is granted to the user 210 to perform an action 183, based upon the user identity 260 and a matching entry in subject 182 of the ACL 121 or authorization certificate 124.

Figure 5:
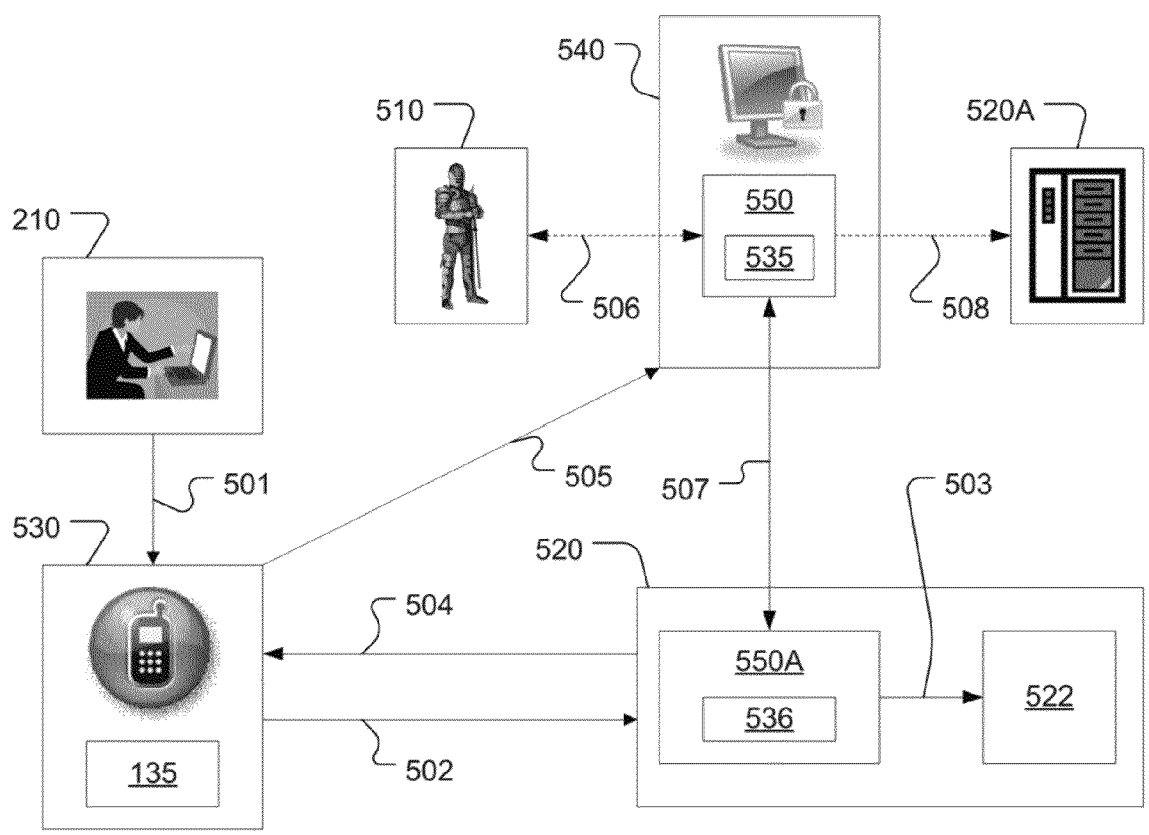
FIG. 5 is an exemplary data flow diagram that illustrates trusted-to-identify access control list management, according to an embodiment.

In FIG. 5, a data flow diagram of TIA management is shown for an embodiment. According to an embodiment, security-aware UPnP devices 520, 520A each include a TIA 522. Entries in a TIA 522 include the identity of a trusted control point, such as control point (CP) 530. As discussed above, in an illustrative example, an identity of a control point 530 may be stored as a hash of a public key uniquely associated with the control point 530, as conventionally specified in UPnP. If the identity of CP 530 is in the TIA 522 of a device 520, then this means that the CP 530 is trusted by the device 520 to make user identity assertions (i.e., to assert a user identity 260).

A security console 540 and the devices 520, 520A, according to an embodiment, each include a TIA management module 550, 550A. TIA management modules 550, 550A are able to manage adding and removing entries in the TIA 522. In an embodiment, TIA management modules 550, 550A may, for example, be implemented as services 125. In further embodiments, TIA management modules 550, 550A may comprise or be included in one or more software applications running on security console 540 or device 520. In an embodiment, an administrative user 510 (e.g., a person who is a trusted administrator) has administrative rights on the security console 540.

TIA management messages can be passed between the TIA management module 550 of a security console (SC) 540 and the TIA management module 550A of a device 520, for managing the TIA 522 of the device 520. In an embodiment, the TIA management messages are analogous to the conventional UPnP messages that are used to manage ACL 121. In a further embodiment, TIA management messages include messages such as a ReadTIA message for reading TIA 522, a WriteTIA message for writing TIA 522, an AddTIAEntry message for adding an entry to TIA 522, a DeleteTIAEntry message for deleting an entry from TIA 522, and a ReplaceTIAEntry message for replacing an entry in TIA 522. In an embodiment, for any of these TIA management messages sent from the SC 540 to succeed in device 520, the SC 540 should be an owner of the device 520 (e.g., should be recognized as an owner in an ownership list 123, not shown, of the device 520).

There are at least two ways to initiate the sending of one or more TIA management messages by a security console 540. In a first illustrative example, a user 210 can directly interact with a TIA management module 550 in a security console 540 that owns the device 520. In a second illustrative example, the user 210 can indirectly initiate addition of an entry in TIA 522, triggered by the user 210 operating a control point 530 to use a device 520 in whose TIA 522 the identity of the control point 530 does not appear.

In the first example, an embodiment of the TIA management module 550 provides an option for the user 210 to directly edit the TIA 522 of device 520. The user 210 operates control point 530, and desires to manipulate an entry in the TIA 522 of device 120; specifically, the entry corresponding to the control point 530. The user 210 needs to know the identity of the control point 530. In an illustrative example, this can be achieved by having control point 530 send (or cause to be sent) a PresentKey message to the security console 540; the user 210 then is simply able to refer to control point 530 by a name previously chosen in the SC 540 for the control point 530.

In a variation of the first example, in a further embodiment, the user 210 operates control point 530, and desires to manipulate an entry in the TIA 522 of device 120; specifically, the entry corresponding to a second control point 130 (not shown). The user 210 needs to know the identity of the control point 130. In an illustrative example, this can be achieved by having control point 530 cause control point 130 to send a PresentKey message to the security console 540; the user 210 then is simply able to refer to control point 130 by a name previously chosen in the SC 540 for the control point 130.

In the second illustrative example, the user 210 can indirectly initiate addition of an entry in TIA 522, triggered by the user 210 operating a control point 530 to use a device 520 in whose TIA 522 the identity of the control point 530 does not appear. Such an exemplary automatic process of adding entries to TIA 522 is referred to herein as an automatic TIA join sequence. It is anticipated that this automatic approach may be the more commonly used method for TIA management in UPnP.

In a security console 540, an embodiment of the TIA management module 550 can include the following exemplary capabilities:

1. TIA management module 550 is able to receive requests from a control point 530 to be added to the TIA 522 of a device 520. An embodiment of such a request contains information such as the identity of control point 530 and the identity of device 520.

2. TIA management module 550 is able to verify whether or not the security console 540 with which the module 550 is associated is indeed an owner of the device 120.

3. TIA management module 550 includes an automatic decision value 535 (e.g., an automatic decision bit having a binary true/false value, or in further embodiments, a field having an integer, bitmapped, or enumerated value). In an embodiment, the automatic decision value 535 is associated with a policy for determining whether the SC 540 can make a decision on a join (or "redirect") request without online consultation with the administrative user 510. This automatic decision value 535 and associated policies can, for example, be set offline by the administrative user 510.

4. TIA management module 550 is able to verify that confirmation of the identity 260 of user 210 has occurred offline, or is needed online.

5. TIA management module 550 is able to communicate with its counterpart in a device 520 (e.g., TIA management module 550A in device 520), to have an entry in TIA 522 added to reflect the trusted-to-identify status of a control point (e.g., control point 530).

6. TIA management module 550 is able to push the new entry in TIA 522 to other devices (e.g., device 520A) that are owned by the security console 540. That is, given that the control point 530 is now trusted to make assertions of identity 260, the security console 540 can optionally add control point 530 to the TIAs 522 of other devices such as 520A.

In a device 520, an embodiment of the TIA management module 550A can include the following exemplary capabilities:

1. TIA management module 550A is able to check whether a TIA entry exists in the device's TIA. Such a check is depicted by arrow 503.

2. TIA management module 550A includes a trigger value 536 (e.g., a trigger bit having a binary true/false value, or in further embodiments, a field having an integer, bitmapped, or enumerated value) that determines whether the module 550A should send a join suggestion (which may in some embodiments comprise a "redirect" message, e.g., redirecting the access request) to the control point 530, suggesting that control point 530 contact the security console 540 to be added to the TIA 522 of device 120.

3. TIA management module 550A is able to send join suggestions (which may in some embodiments comprise a "redirect" message, e.g., redirecting the access request) to the control point 530 via the device 120. Such a join suggestion is depicted by arrow 504.

4. TIA management module 550A is able to receive requests for the identity of control point 530 to be added to the TIA 522 of device 120. Such a request is depicted by arrow 502.

In an exemplary automatic TIA join sequence, steps 501-508 indicate an exemplary chronological sequence; however, not all of the illustrated steps are necessary, and not all steps need be performed online. For example, confirmation step 506 may be done offline using the automatic decision value 535 and an associated policy.

In the exemplary automatic TIA join sequence, at step 501, the user 210 accesses the control point 530 to identify himself or herself. Control point 530 obtains, or has previously obtained, an identity 260 corresponding to user 210. Control point 530 may include a Identity Assertion Capable (IDC) 135 attribute, as discussed above, indicating that control point 530 is capable of verifying identity in a trustworthy fashion. From the perspective of user 210, it is desirable that CP 530 should be recognized by device 520 as trusted-to-identify, and therefore that CP 530 should appear in the TIA 522 of device 520.

At step 502, the control point 530 communicates an access request to device 520, including the identity 260 of the user 210, as well as the identity of the control point 530. At step 503, the TIA management module 550A of device 520 checks the TIA 522, to determine whether the identity of the control point 530 is included in TIA 522. At step 504, if the identity of the control point 530 is not included in TIA 522, a "redirect" may take place, depending upon the value of trigger value 536. The TIA management module 550A of device 530 checks the trigger value 536, and if the trigger value 536 indicates that a "redirect" is desired, TIA management module 550A sends a responsive message back to control point 530, containing an identification of a security console 540 that owns the device 520. In a further embodiment, the responsive message comprises a join suggestion (which may in some embodiments comprise a redirection of the access request). Otherwise, the TIA management module 550A may simply proceed to grant or deny the requested permission on device 520 for user 210.

At step 505, having received a join suggestion or "redirect" message from device 520 at step 504, the control point 530 sends a join request (which in some embodiments may comprise a further "redirect" message or redirection of the access request) to the TIA management module 550 of security console 540. In an embodiment, the illustrative join request includes the identity of the control point 530, and may include the identity 260 of the user 210, the identity of the device 520, and/or the identity of the owner (i.e., the identity of security console 540). In an embodiment, the security console 540 verifies whether security console 540 is indeed an owner of device 520.

At step 506, based upon the automatic decision value 535, and associated policy, the TIA management module 550 of the security console 540 may require confirmation (e.g., online consultation) from administrative user 510, or in further embodiments, may recognize whether such confirmation is unnecessary (e.g., the confirmation or lack thereof having been predetermined by administrative user 510).

At step 507, if desired based upon the result of step 506, the TIA management module 550 of the security console 540 can send a TIA management message such as AddTIAEntry to counterpart TIA management module 550A in device 520, requesting that the identity of control point 530 be added to TIA 522 as a new entry, indicating that control point 530 is trusted to identify users.

Optionally, at step 508, if desired based upon the result of step 506, the TIA management module 550 can also push the new entry in TIA 522 to other devices (e.g., device 520A) that are owned by the security console 540.

Figure 6:
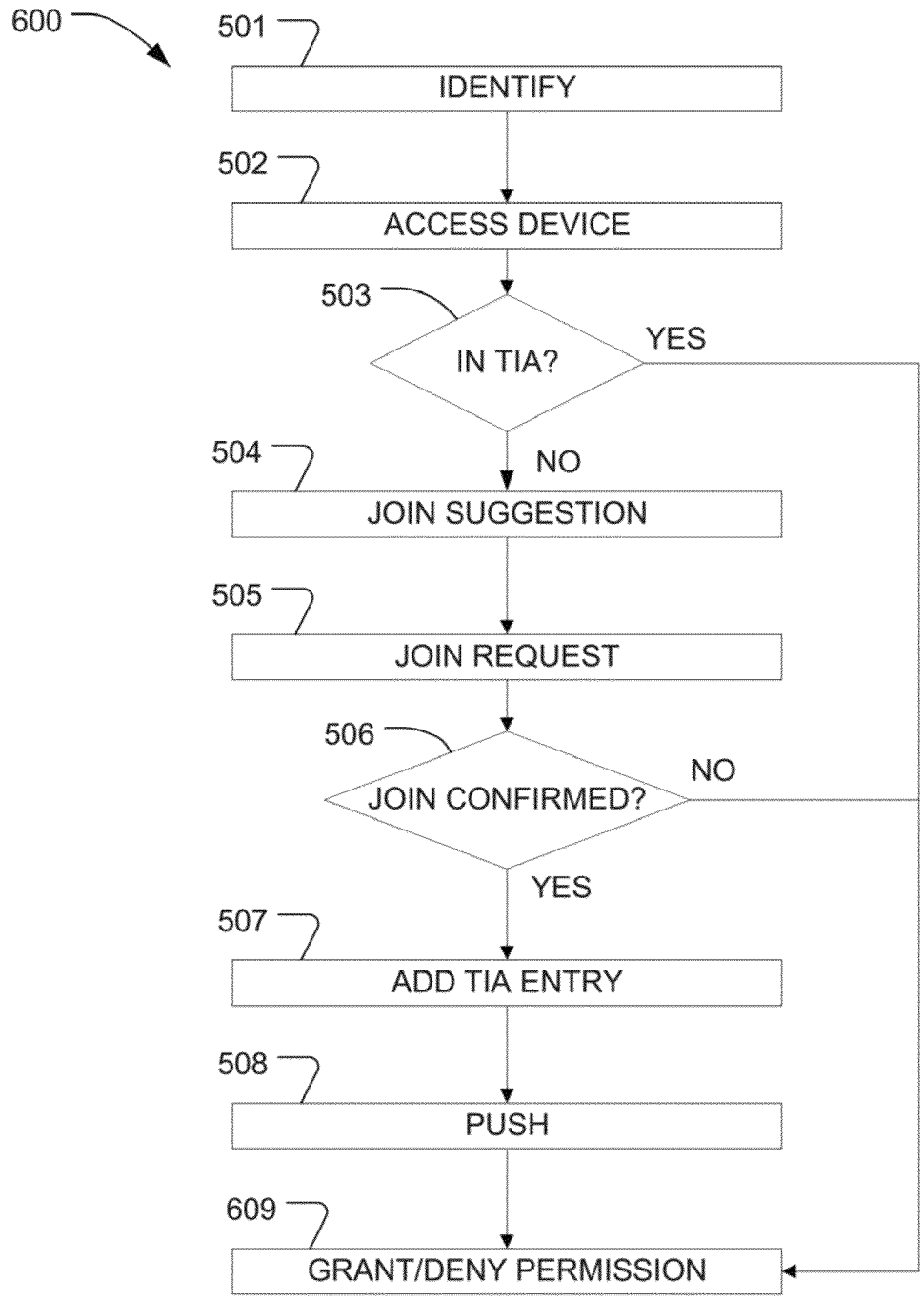
FIG. 6 is an exemplary flow diagram that illustrates a method for trusted-to-identify access control list management, according to an embodiment.

FIG. 6 illustrates an exemplary method 600 for an automatic TIA join sequence, according to an embodiment. As depicted in FIG. 5, steps 501-508 indicate an exemplary chronological sequence; however, not all of the illustrated steps are necessary, and not all steps need be performed online. From the standpoint of device 520 (except for its TIA management module 550A), the automatic TIA join sequence of method 600 is simply part of a determination by device 520 of whether to grant access to the current request or not. If the automatic TIA join sequence of method 600 runs successfully, then the device 520 grants access to the user 210 for the current access request, e.g., based on whether the identity 260 of the user 210 appears as a subject 182 in an access control list 121 associated with device 520 indicating that user 210 has permission for such access.

In the exemplary automatic TIA join sequence of method 600, steps 501 and 502 proceed as discussed above with respect to FIG. 5. At step 503, the TIA management module 550A of device 520 checks the TIA 522, to determine whether the identity of the control point 530 is already included in TIA 522, and if so, the method 600 proceeds to step 609, where permission is granted or denied to user 210, e.g., based on whether the identity 260 of the user 210 appears as a subject 182 in an access control list 121 associated with device 520. If the identity of the control point 530 is not included in TIA 522, the method 600 proceeds to step 504.

Steps 504 and 505 proceed as discussed above with respect to FIG. 5. At step 506, based upon the automatic decision value 535, and associated policy, the TIA management module 550 of the security console 540 may require confirmation (e.g., online consultation) from administrative user 510, or in further embodiments, may recognize whether such confirmation is unnecessary (e.g., the confirmation or lack thereof having been predetermined by administrative user 510). If the confirmation indicates that the TIA 522 should not be updated, the method 600 proceeds to step 609, where permission is granted or denied to user 210, e.g., based on whether the identity 260 of the user 210 appears as a subject 182 in an access control list 121 associated with device 520. If the confirmation indicates that the TIA 522 should be updated, the method 600 proceeds to step 507.

Steps 507 and 508 proceed as discussed above with respect to FIG. 5. At step 609, permission is granted or denied to user 210, e.g., based on whether the identity 260 of the user 210 appears as a subject 182 in an access control list 121 associated with device 520.

Figure 7:
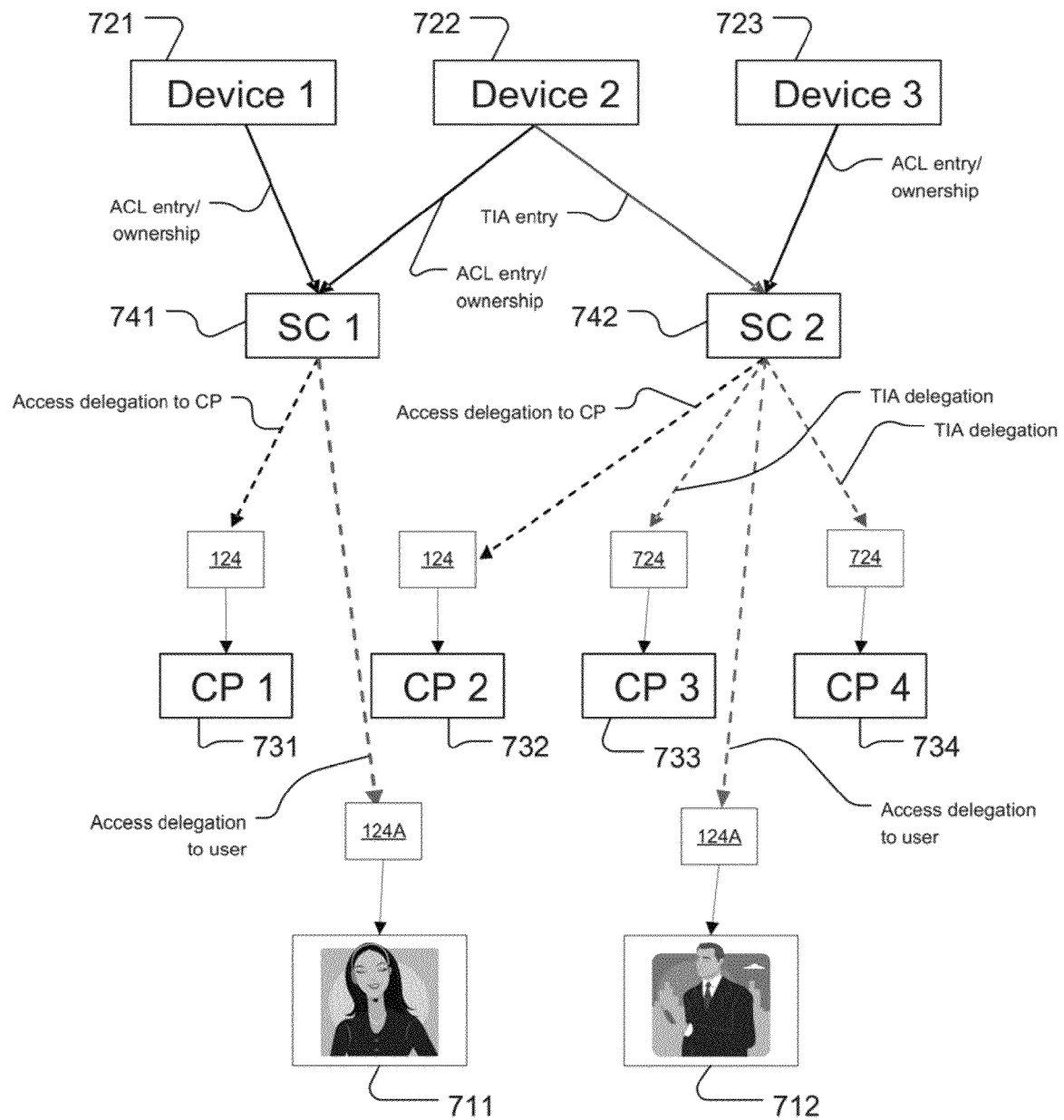
FIG. 7 is an exemplary flow diagram that illustrates delegation, according to an embodiment.

In FIG. 7, a data flow diagram of delegation is shown for an embodiment. The conventional UPnP security specification allows for delegation of access by one control point to another. As discussed above with reference to FIG. 1, conventional delegation is effected by the issuance of what is called an authorization certificate 124, which identifies the delegator, the delegatee, the device and nature of access, and an optional validity time-frame. A security console (SC) can be given "direct" access to a device, which is done in one of two ways: the SC may be made an owner of the device, thereby giving it unfettered access; or, the SC is added to the device's ACL for particular kinds of access. Given that delegation is a useful feature of UPnP security, aspects of the present invention include embodiments that extend the delegation mechanism to incorporate TIAs, providing usability benefits with delegation within the TIA framework.

In an embodiment, an authorization certificate 124 can comprise a TIA delegation certificate 724. With reference to FIG. 1A, 1B, and FIG. 2, the TIA delegation certificate 724 enables a first CP 143 to delegate to a second CP 130 the trust a device 120 has in the first CP 143 to make identity assertions. In some embodiments, a security console 140 comprises the first CP 143. In a first illustrative example, security console 140 is always trusted to make identity assertions for a device 120 that is owned by the security console 140, by virtue of such ownership. The security console 140 can delegate that trust to a second CP 130. In a second illustrative example, In a second illustrative example, security console 140 includes CP 143, and the identity of CP 143 appears in the TIA 122 of device 120; therefore, security console 140 is trusted to make identity assertions for a device 120 that is owned by the security console 140. The security console 140 can delegate that trust to a second CP 130.

In an embodiment, a TIA delegation certificate 724, like a conventional authorization certificate 124, includes an issuer field and a device field; thus, the TIA delegation certificate 724 can be used by the control point 130 to which it has been issued, in order to certify to the device 120 that the issuer (e.g., security console 140) has delegated trust to control point 130.

Returning to FIG. 7, in an illustrative example, devices 721, 722, 723 each have a TIA 122 and an ACL 121. Device 721 is owned by security console 741, or in a further embodiment, has granted access rights to security console 741 in the ACL 121 of device 721. Device 722 also is owned by security console 741, or in a further embodiment, has granted access rights to security console 741 in the ACL 121 of device 722. Device 723 is owned by security console 742, or in a further embodiment, has granted access rights to security console 742 in the ACL 121 of device 723. In device 722, there is an entry in TIA 122 indicating that security console 742 is a trusted control point.

Security console 741, using a conventional authorization certificate 124, grants access delegation rights to CP 731. Security console 741, using a first authorization certificate 124A of an embodiment of the present invention, grants access delegation rights to user 711, by including the identity 260 of user 711 as a subject 182.

Security console 742, using a conventional authorization certificate 124, grants access delegation rights to CP 732. Security console 742, using a first TIA delegation certificate 724, grants TIA delegation rights to CP 733. Security console 742, using a second authorization certificate 124A of an embodiment of the present invention, grants access delegation rights to user 712, by including the identity 260 of user 712 as a subject 182. Security console 742, using a second TIA delegation certificate 724, grants TIA delegation rights to CP 734.

Figure 8:
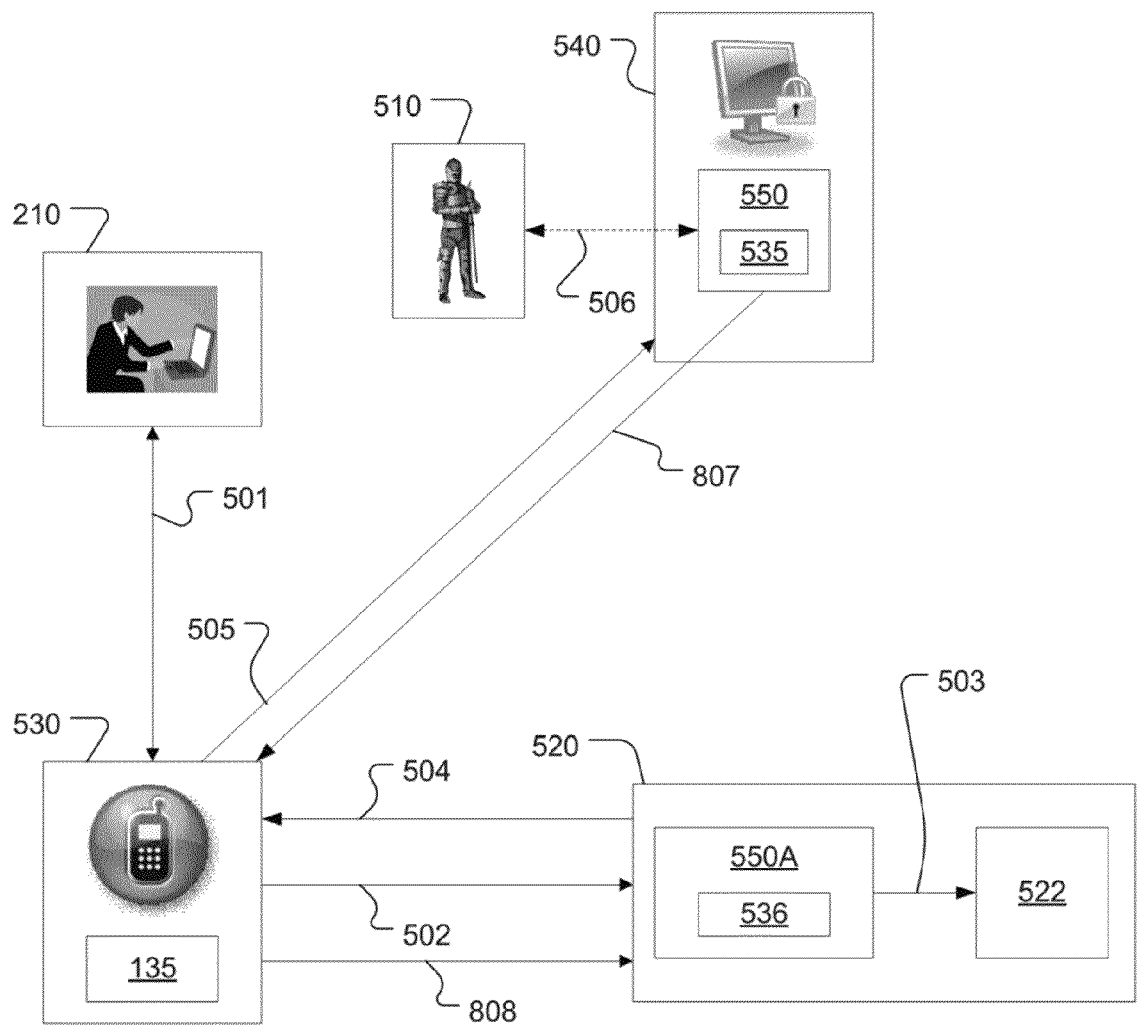
FIG. 8 is an exemplary data flow diagram that illustrates trusted-to-identify access control list management using delegation, according to a further embodiment.

FIG. 8 is an exemplary data flow diagram that illustrates trusted-to-identify access control list management using delegation, according to a further embodiment. In an embodiment, the automatic TIA join sequence is different from that of FIG. 5, because the SC 540 includes an automatic decision value 535, associated with a corresponding policy, that causes TIA management module 550 to issue a delegation certificate 724 (not shown). Steps 501 through 506 proceed as described with regard to FIG. 5. After step 506, at step 807, the TIA management module 550 of SC 540 issues the delegation certificate 724 (not shown) to control point 530. Next, at step 808, control point 530 reissues the access request to device 520, this time using the delegation certificate 724.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for establishing access control in a network, the method comprising:
   transmitting, from a control point, an instruction to perform an action on a device;
   in response to transmitting the instruction, receiving a request from the device to authenticate a user;
   determining whether to authenticate the user based on an identity assertion capability associated with the control point, wherein the identity assertion capability has an attribute value that, when the attribute value is declared to be true, indicates that the control point is capable of authenticating the user;
   in response to determining that the attribute value associated with the identity assertion capability has been declared to be true to indicate that the control point is capable of authenticating the user, transmitting a user identity corresponding to the user to the device;
   receiving permission to perform the action on the device; and
   causing the action to be performed on the device based on the user identity.

2. The method of claim 1, wherein a default value of the attribute value is false.

3. The method of claim 1, further comprising registering with a security console by transmitting an identifier to the security console.

4. The method of claim 1, wherein the user identity is received from a security console.

5. The method of claim 1, further comprising:
   receiving, from the device, an indication that permission to perform the action on the device has been denied because the transmitted user identity is not trusted by the device; and transmitting, to the device, a message indicating that an identifier is to be added to an access control list on the device.

6. The method of claim 1, further comprising:
receiving a delegation certificate from a security console that has been granted ownership permission of the device;
transmitting a second request to perform the action on the device, wherein the second request includes the received delegation certificate;
receiving permission to perform the action on the device based on the delegation certificate; and
causing the action to be performed on the device.

7. A system for establishing access control in a network, the system comprising:
a hardware processor that is programmed to:
transmit, from a control point, an instruction to perform an action on a device;
in response to transmitting the instruction, receive a request from the device to authenticate a user;
determine whether to authenticate the user based on an identity assertion capability associated with the control point, wherein the identity assertion capability has an attribute value that, when the attribute value is declared to be true, indicates that the control point is capable of authenticating the user;
in response to determining that the attribute value associated with the identity assertion capability has been declared to be true to indicate that the control point is capable of authenticating the user, transmit a user identity corresponding to the user to the device;
receive permission to perform the action on the device; and
cause the action to be performed on the device based on the user identity.

8. The system of claim 7, wherein a default value of the attribute value is false.

9. The system of claim 7, wherein the hardware processor is further programmed to register with a security console by transmitting an identifier to the security console.

10. The system of claim 7, wherein the user identity is received from a security console.

11. The system of claim 7, wherein the hardware processor is further programmed to:
receive, from the device, an indication that permission to perform the action on the device has been denied because the transmitted user identity is not trusted by the device; and
transmit, to the device, a message indicating that an identifier is to be added to an access control list on the device.

12. The system of claim 7, wherein the hardware processor is further programmed to:
receive a delegation certificate from a security console that has been granted ownership permission of the device;
transmit a second request to perform the action on the device, wherein the second request includes the received delegation certificate;
receive permission to perform the action on the device based on the delegation certificate; and
cause the action to be performed on the device.

13. A non-transitory computer-readable medium containing computer executable instructions that, when executed by a processor, cause the processor to perform a method for establishing access control in a network, the method comprising:
transmitting, from a control point, an instruction to perform an action on a device;
in response to transmitting the instruction, receiving a request from the device to authenticate a user;
determining whether to authenticate the user based on an identity assertion capability associated with the control point, wherein the identity assertion capability has an attribute value that, when the attribute value is declared to be true, indicates that the control point is capable of authenticating the user;
in response to determining that the attribute value associated with the identity assertion capability has been declared to be true to indicate that the control point is capable of authenticating the user, transmitting a user identity corresponding to the user to the device;
receiving permission to perform the action on the device; and
causing the action to be performed on the device based on the user identity.

14. The non-transitory computer-readable medium of claim 13, wherein a default value of the attribute value is false.

15. The non-transitory computer-readable medium of claim 13, wherein the method further comprises registering with a security console by transmitting an identifier to the security console.

16. The non-transitory computer-readable medium of claim 13, wherein the user identity is received from a security console.

17. The non-transitory computer-readable medium of claim 13, wherein the method further comprises:
receiving, from the device, an indication that permission to perform the action on the device has been denied because the transmitted user identity is not trusted by the device; and
transmitting, to the device, a message indicating that an identifier is to be added to an access control list on the device.

18. The non-transitory computer-readable medium of claim 13, wherein the method further comprises:
receiving a delegation certificate from a security console that has been granted ownership permission of the device;
transmitting a second request to perform the action on the device, wherein the second request includes the received delegation certificate;
receiving permission to perform the action on the device based on the delegation certificate; and
causing the action to be performed on the device.

* * * * *